Oct. 23, 1962 S. J. JOHNSON ETAL 3,059,546
MACHINE FOR MILLING TOOTHED ROTARY PARTS
Filed Jan. 19, 1961 7 Sheets-Sheet 1

INVENTORS
Stuart J. Johnson
Ernest F. Bruns
George F. Whitman
BY Wolfe, Hubbard, Voit & Osann
ATTORNEYS Oct. 23, 1962   S. J. JOHNSON ETAL   3,059,546
MACHINE FOR MILLING TOOTHED ROTARY PARTS
Filed Jan. 19, 1961                    7 Sheets-Sheet 5

INVENTORS
Stuart J. Johnson
Ernest F. Bruns
George F. Whitman
BY
ATTORNEYS Oct. 23, 1962   S. J. JOHNSON ETAL   3,059,546
MACHINE FOR MILLING TOOTHED ROTARY PARTS
Filed Jan. 19, 1961   7 Sheets-Sheet 6

FIG. 16.

INVENTORS
Stuart J. Johnson
Ernest F. Bruns
George F. Whitman
BY Wolf, Hubbard, ...
ATTORNEYS United States Patent Office 3,059,546
Patented Oct. 23, 1962

3,059,546
MACHINE FOR MILLING TOOTHED ROTARY
PARTS
Stuart J. Johnson, Ernest F. Bruns, and George F. Whitman, Rockford, Ill., assignors to Barber-Colman Company, Rockford, Ill., a corporation of Illinois
Filed Jan. 19, 1961, Ser. No. 83,662
6 Claims. (Cl. 90—4)

This invention relates to the milling of gears, ratchets, splines and similar toothed rotary parts in an ordinary hobbing machine in which the work and a hob are rotated in precise synchronism while being fed relative to each other along the work axis. In such machines using an ordinary hob, metal is milled from the work by a so-called generating action in which only part of the multi-sided cutting edge of the successively acting hob teeth comes into cutting engagement with the work at any time. That is to say, the metal is removed in a succession of cuts first on one side of the interdental space and then on the other, the accumulation of such cuts producing the desired tooth form. Thus, instead of having a profile corresponding to the cross section of the interdental spaces to be formed as in milling, the cutting faces of the hob teeth are of the same height and of different shape than such spaces.

In contrast to such generating action, toothed parts have been formed in a hobbing machine by a milling cutter having teeth of a form which will produce the required profile of the interdental spaces and arranged in a row inclined at a helix angle corresponding to the pitch of the work teeth. With such cutters, the chips removed by each tooth vary widely in thickness from one side of the tooth to the other so that the permissible rate of metal removal is limited by the maximum chip thickness and in actual practice, is not increased appreciably as compared with the generating action of a true hob.

The primary object of the invention is to provide a hobbing machine equipped with a cutter of the latter character incorporating certain operating characteristics of the machine and having a helical row of teeth positioned in a novel manner to achieve substantially more uniform loading of the cutting edges and efficient cutting action than has been possible heretofore with the result that many kinds of tooth parts can be produced at greatly reduced cost.

A more detailed object is to achieve such uniform loading of the cutting edges by correlating the radial positions of the cutting edges with the rate of feed to be used in service and by tilting the successively acting teeth laterally of the row and the pitch of the teeth to be cut on the work.

The invention also resides in the novel manner of producing the desired tilting of the cutter teeth while maintaining uniformity of the profiles of their cutting edges.

Other objects and advantages of the invention will become apparent from the following details description taken in connection with the accompanying drawings, in which.

Figure 9:
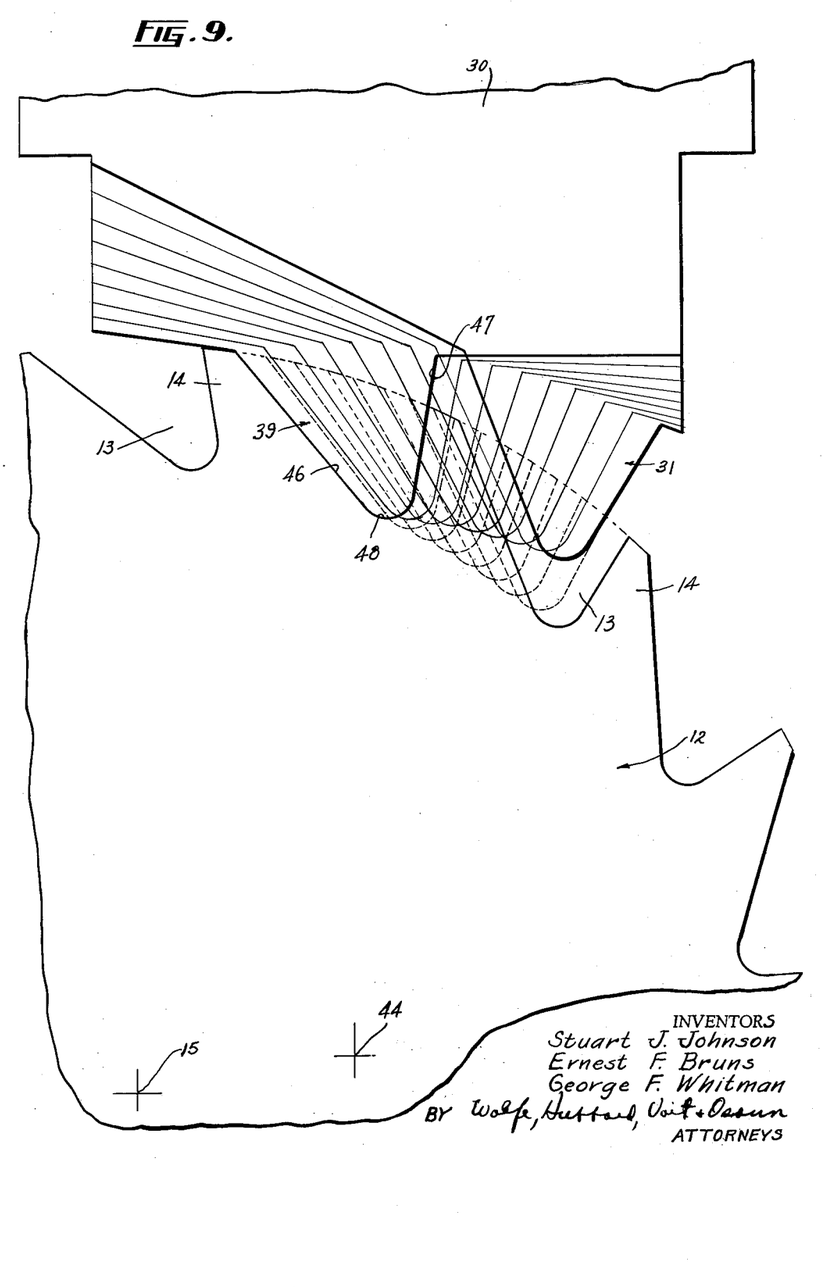
FIG. 9 is a similar schematic view showing the relation of the cutter teeth and a finished workpiece.
Figures 10, 11:
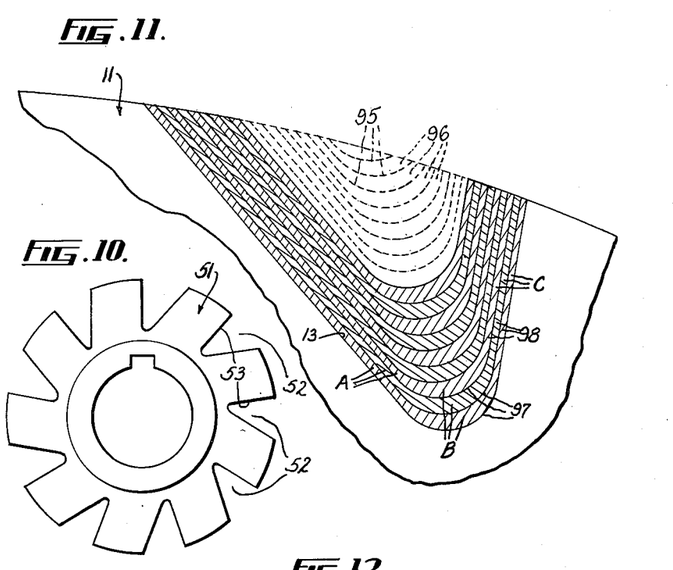
FIG. 10 is an end view of the cutter blank.
FIG. 11 is an enlarged cross-sectional view of one of the toothed spaces showing the arrangement of the metal layers removed by the cutter teeth.

In the rawings, the invention is shown for purposes of illustration incorporated in a hobbing machine (FIG. 16) equipped with a special milling cutter 10 operable in a conventional hobbing cycle to mill away successive layers or chips of metal as shown in FIG. 11 from a cylindrical work blank 11 (FIG. 3) to form a ratchet wheel 12 (FIGS. 2, 3 and 9) having interdental spaces 13 between peripheral teeth 14. As in conventional hobbing, the cycle involves mounting the work blank and cutter to turn about spaced transversely extending axes 15 and 16 and relatively feed the two along the work and cutter in the directions indicated by the arrows in FIGS. 2 and 3.

Figure 16:
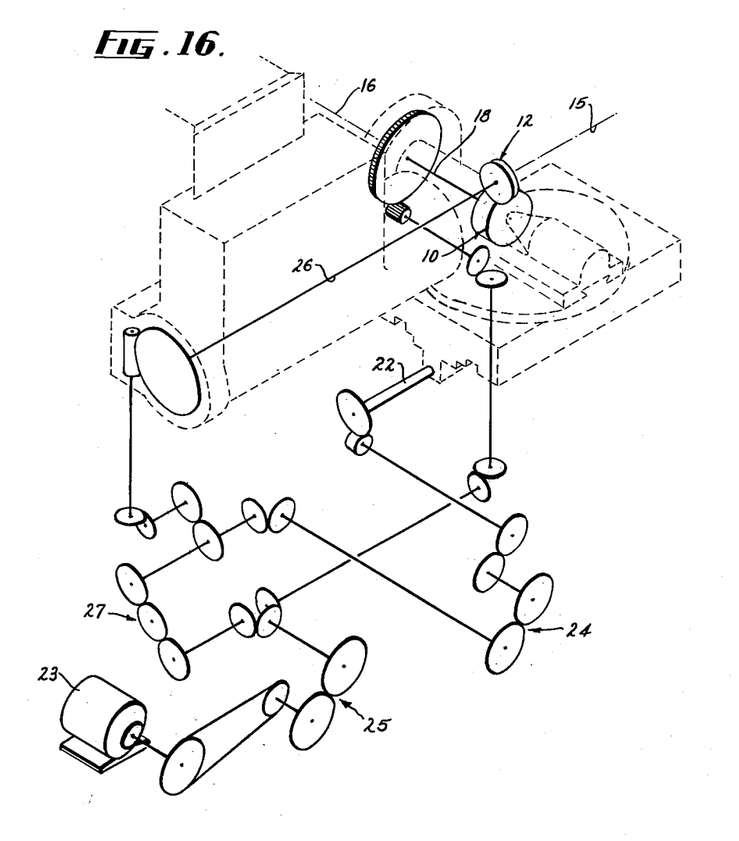
FIG. 16 is a schematic view showing the elements of the hobbing machine incorporating the improved cutter.

In the machine shown schematically in FIG. 16, the cutter 10 is fast on a spindle 18 journaled on the usual slide supported from a carriage (not shown) which is slidable horizontally along the machine bed. A screw 22 for feeding the cutter along the work axis 16 is driven by a motor 23 through suitable gearing including feed change gears 24. The cutter is driven by the motor through gearing including speed change gears 25. The workpiece 12 is fast on a spindle 26 mounted on the usual vertically movable slide and driven through a gear train including index change gears 27. With this arrangement, the workpiece and cutter are rotated in proper synchronism with each other while being fed axially to carry the cutter across the work.

Figure 1:
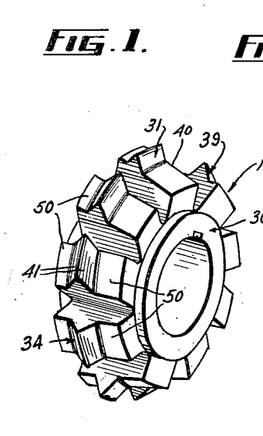
FIGURE 1 is a perspective view of a milling cutter incorporating the novel features of the present invention.
Figures 2, 3:
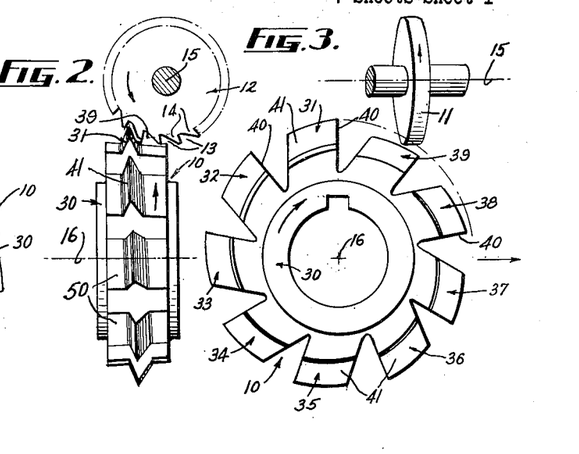
FIG. 2 is a side view showing the relation of the cutter and a partially milled workpiece.
FIG. 3 is a side view of the cutter and a workpiece shown in FIG. 2.
Figure 4:
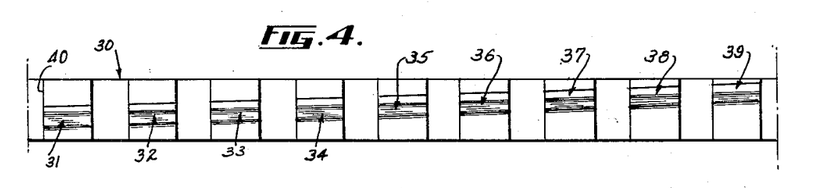
FIG. 4 is a development view of the periphery of the cutter.

In the form shown in FIGS. 1 to 3, the cutter 10 comprises generally a helically extending row of teeth 31 to 39 projecting outwardly from and spaced apart uniformly around a ring-like body 30 and having cutting edges $a$, $b$ and $c$ at the sides and ends of cutting faces 40, the back of each tooth being relieved to provide a clearance face 41 for each part of the tooth. In accordance with conventional practice, the helix angle of the row of teeth is determined by the pitch of the teeth 14 on the part to be produced, the diameter of the cutter, and the number of starts, that is, the number of rows of teeth on the cutter.

In the cutter illustrated, the cutting edges a, b and c of all of the cutter teeth are formed to the same profile which corresponds to the cross-sectional profile of the tooth spaces 13 to be formed in the work. By forming the clearance faces 41 in a conventional back-off type of lathe, the original profile of the cutting edges is maintained after sharpening of the teeth by grinding away the cutting faces 40.

The teeth which come into engagement with the work successively beginning with the first tooth 31 and ending with the final or finishing tooth 39 may be stepped outward progressively from the cutter axis as shown in FIG. 3, or inwardly or, all of the teeth may be disposed equidistantly from the cutter axis. Whether the teeth are stepped outwardly or inwardly depends on several factors including the diameter of the workpiece to be produced, the shape of the interdental spaces 13 to be formed therein, the angle at which the cutter is set in the hobbing machine, and most important the rate at which the cutter is to be fed axially across the work.

The amount of the step in or step out of the successively acting teeth is determined in each instance by the material of which the cutting edges are composed, the work material to be operated on, and again the feed rate to be employed in the hobbing machine where the cutter is to be used. In other words, these factors determine the thickness of those parts B of the successive chips (FIG. 11) which are removed by the outer tips b of the cutter teeth. The maximum permissible thickness of these parts of the chips is of course determined by the work and cutting materials involved. Thus, these same factors determine the number of teeth needed in each row in order to cut the interdental spaces of the desired radial depth in the work without in any instance exceeding the maximum permissible thickness in the parts B of the chips.

In accordance with the present invention, the successive teeth in the helical row are tilted progressively relative to the cutter body so as to compensate for the relative turning of the cutter and work during the action of the successive teeth and cause the sides a and c of the cutting edges to be loaded substantially uniformly, that is, to remove metal in layers A and C which are approximately of equal thickness and which correspond approximately to the thickness of the layers B removed by the tips of the cutter teeth as determined by the preselected feed rate to be used. Such tilting of the teeth is evidenced by the different angles x (FIGS. 6, 7 and 8) at which the center lines y of the teeth are inclined relative to planes z perpendicular to the cutter axis 16. Thus, in the case of the cutter shown in FIG. 3 in which the successively acting teeth are stepped outwardly, the angle x will be the largest in the case of the first tooth 31 and will decrease progressively beginning with this tooth and ending with the last or finishing tooth 39 whose center line, in this instance, is perpendicular to the cutter axis.

Conversely, if the successively acting teeth are stepped inwardly in the adaptation of the present invention for forming a particular tooth form on a given workpiece, the cutter teeth 31 to 39 will be tilted reversely, the angles x being increased progressively along the row from the first tooth to the last tooth.

Figure 13:
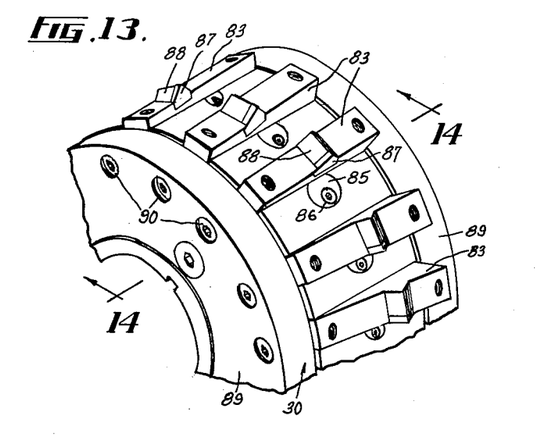
FIG. 13 is a fragmentary perspective view of an inserted blade version of the improved cutter.
Figure 14:
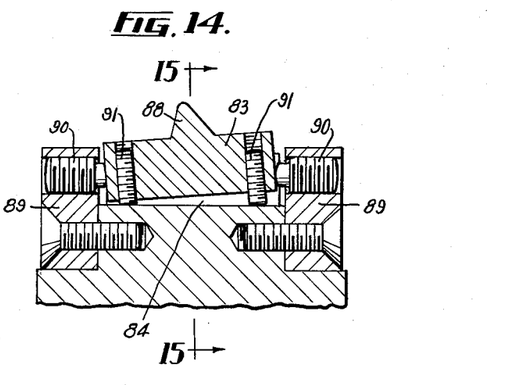
FIG. 14 is a section taken along the line 14—14 of of FIG. 13.
Figure 15:
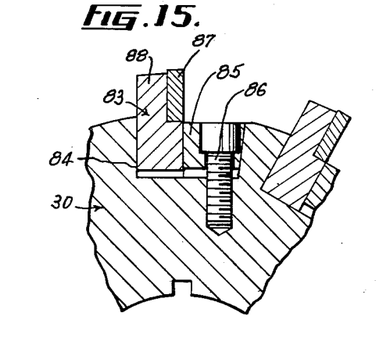
FIG. 15 is a fragmentary section taken along the line 15—15 of FIG. 14.

The shaping of the cutting edges and the desired progressive tilting thereof may be achieved in various ways as for example by forming the teeth as separate elements and securing the same in different positions relative to the cutter body as illustrated in FIGS. 13 to 15. Where, as illustrated in FIGS. 1 to 9, the teeth are made integral with the body 30, the desired tilting and positioning thereof may easily be achieved at low cost and with the desired precision by shaping the cutting edges of all of the teeth by the same form tool 42 and, during shaping of the successive edges, moving the tool along the cutter axis through a range equal to the pitch of the teeth to be formed on the work. In some cases, the cutter teeth will be stepped outward progressively as shown in FIG. 3. Such stepping may be accomplished by moving the form tool along a curved path 43 (FIGS. 5 to 8) while the successive teeth are being formed, the swinging being about a fixed axis 44 usually offset laterally from the center line 45 of the tool and extending transversely of the cutter axis but spaced outwardly a substantial distance beyond the cutter teeth.

Figure 5:
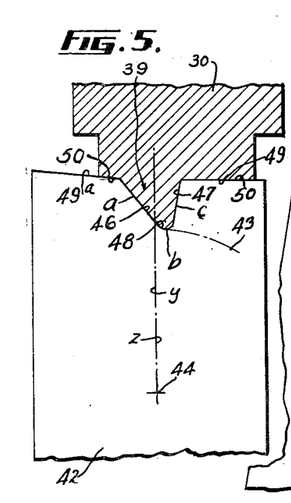
FIGS. 5, 6 and 7 are fragmentary diametrical sectional views of the cutter and the tool for forming the cutter teeth.
Figure 6:
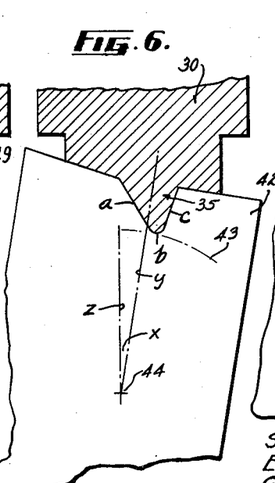
Figure 7:
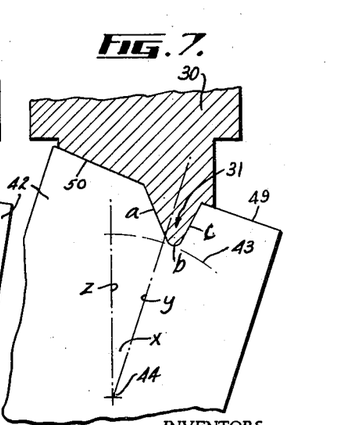

The form tool 42 is a rigid bar notched at one end to form cutting edges 46 and 47 usually converging to an apex 48 and cooperating to define a profile whose shape corresponds in the present instance precisely with the finished profile of the interdental spaces 13 to be milled in the work by the final tooth 39 of the cutter. The notch is somewhat deeper than the height of the teeth 14 to be formed in the work and is flanked by alined and straight end cutting edges 49 and 49$^a$ which mill away metal from the cutter blank 30 and form peripheral surfaces 50 on opposite sides of the row of teeth. As shown in FIGS. 5 to 7, these surfaces vary in contour with the swinging of the form tool, the surface 49 being disposed perpendicular to the center line y of the associated cutter tooth in this instance.

Figures 17, 18:
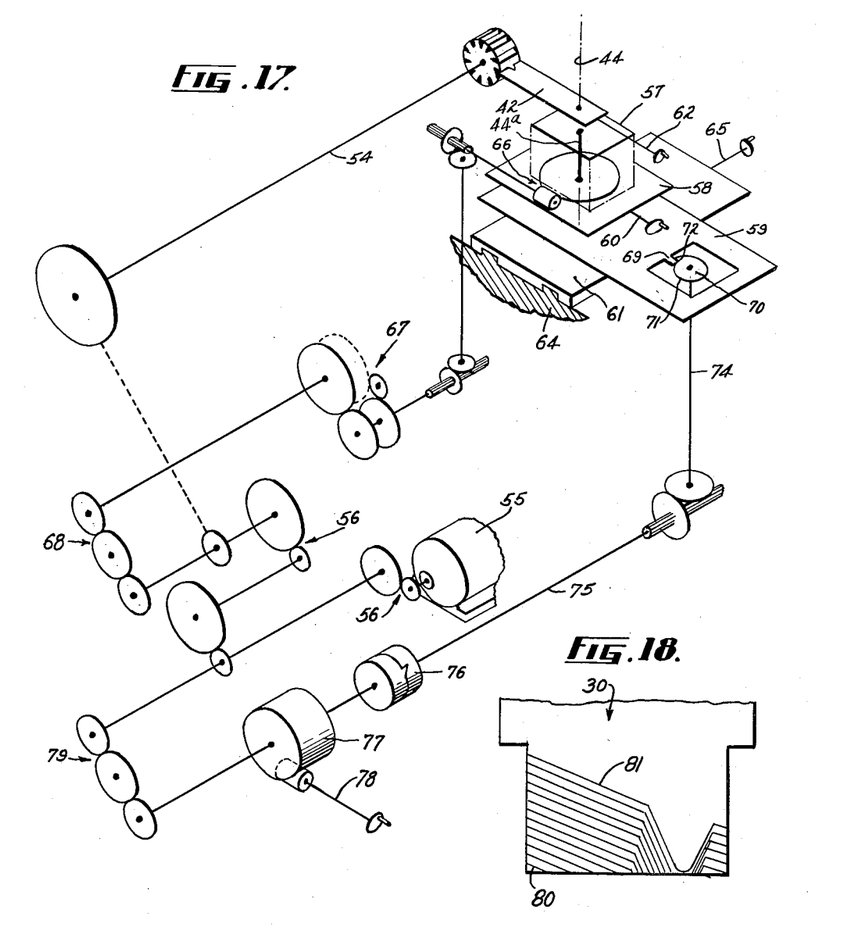
FIG. 17 is a schematic view showing the elements of a back-off machine used in forming the cutter teeth.
FIG. 18 is a fragmentary view of part of the cutter showing the manner of removing metal to form a cutter tooth.

The lathe type tool thus shaped is used to form the cutting edges of all of the cutter teeth in a turning operation performed in a conventional back-off type of lathe such as that shown in Reissue Patent No. 18,246 but modified as illustrated schematically in FIG. 17 to swing the tool through the proper range and in precise synchronism with its cutting engagement with the different cutter teeth in the helical row. The cutter blank 51 shown in FIG. 10 comprises a metal cylinder fluted longitudinally to form grooves 52 whose walls 53 are positioned according to the desired locations of the leading or cutting faces 40 of the cutter teeth.

The blank is secured to an arbor 54 driven at the desired speed by an electric motor 55 operating through suitable gearing 56. The form tool 42 is mounted for endwise feeding adjustment as by a hand screw 62 on a swivel 57 journaled on a slide 58 to swing about an axis 44$^a$.

By adjusting the screw 62, the swing axis 44 of the tool may be located in the desired predetermined position relative to the swivel axis 44$^a$. The swivel 57 in turn is supported by a saddle 59 and guided for adjustment by a screw 60 in a direction transversely of the work arbor. The saddle 59 is mounted on a cross-slide 61 and guided thereby for movement parallel to the swivel adjustment. The slide 61 is mounted on the machine bed 64 for adjustment by a screw 65 in a direction parallel to the work arbor.

Through suitable mechanism including splines, a worm and worm wheel 66, reversing gears 67 and lead change gears 68, the swivel 57 is adapted to be turned by the motor 55 in all positions of adjustment of the slide 58 and the saddle 59. A follower 69 on the saddle 59 engages a cam 70 whose gradual rise 71 controls the feeding of the tool 42 into the successive teeth on the blank and thereby form the clearance faces 41 on the teeth in a manner well understood in the art.

The cam rise terminates abruptly at 72 to allow the saddle and the tool 42 to be backed abruptly away from the cutter blank by a spring suitably coupled to the saddle. The cam is fast on an upright shaft 74 spline coupled and geared to a shaft 75 coupled through a one way clutch 76, differential gearing 77 and speed change gears 79 to the motor driven shaft. The clutch is engageable in only one angular position of its parts, and the shaft 75 is manually adjustable through the differential 77 by turning a shaft 78.

The extent of the the swing of the tool while taking cuts to form the successive cutter teeth in the row will be determined by the pitch of the teeth 14 to be milled on the work and also by the number of rows or starts on the cutter. Where only one row of teeth is used, the notch of the form tool 42 will be swung through an angle such as to carry the notch along the cutter blank and the path 43 a distance corresponding to the pitch of the work teeth.

The axis 44 about which the tool is swung may be located in various ways so as to impart the desired tilt to the cutter teeth while they are being shaped in the turning operation. The required location of this axis may be calculated after knowing various dimensions of the work to be produced and the cutter to be used and the intended feed rate to be used in the hobbing machine. Or, it may be located by a layout procedure using large scale drawings of the finished workpiece and the form tool. Thus the approximate position and shape of the successive chips of the permissable thickness may be laid out in one tooth space 13 of the workpiece somewhat as shown in FIG. 11. In forming this outline, the preselected feed rate to be used in service is taken into consideration along with the maximum permissable thickness of the chip layers as determined by the cutting and work materials being used.

Figure 8:
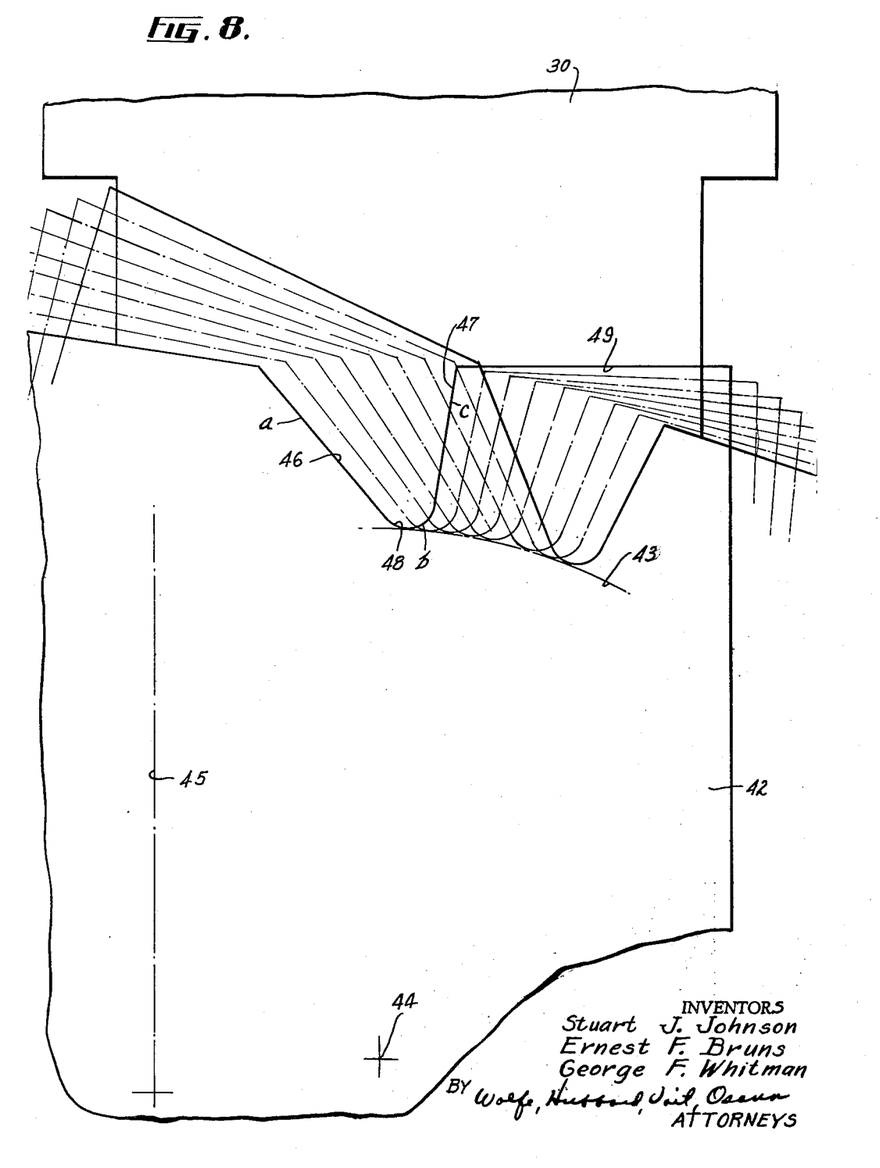
FIG. 8 is an enlarged fragmentary diametrical view of the cutter and the form tool.

From this outline, the proper positions of the first and final teeth 31 and 39 may be outlined on an associated layout of the cutter blank as shown by the solid lines in FIG. 9, the proper positions of the intervening teeth for the different angular positions of the tooth space being shown in phantom. Finally, and as illustrated in FIG. 8, by using a form tool template of the same scale as the work and cutter layouts above described, the edges of the template may be matched in different angular positions with the tooth outlines thus determined for the first and final teeth 31 and 39 so as to establish the axis 44 in a position which will permit the template notch to coincide with the teeth at the limits of the swing range as shown by the full lines in FIG. 8.

With the location of the swing center 44 now ascertained, the form tool may now be mounted in the back-off machine (FIG. 17) with this center properly positioned with the axis of the swivel 57. The proper gears are incorporated in the units 68 and 79 for effecting swinging of the tool through the predetermined angle $x$ while the row of teeth on the cutter blank 51 is passing the tool. By manipulating the screws 60, 62 and 65, the tool may be adjusted to locate the swing axis 44 in the predetermined position relative to the cutter blank and also position the tool as shown in FIG. 7 for shaping the first tooth 31 and the succeeding teeth of the row in a succession of cuts taken during successive revolutions of the cutter blank as determined by manual adjustment of the tool slide by the hand screw 60. By manipulating the screw 78, the cam 70 may be brought into the proper starting position relative to its follower.

With the machine conditioned for turning of the work and swinging of the form tool in proper synchronism with the advancing and abrupt retracting movements of the tool as produced by the cam 70, the tool is set by the hand screw 62 for taking the first cut 80 (FIG. 18) around the periphery of the first blank tooth. In this movement, the tool is advanced by the cam to initiate formation of the clearance face 41 of the first tooth. This action by the cam is repeated as the successive teeth of the blank to engage and pass the form tool in the first revolution.

When the final tooth of the row is presented to the form tool, the latter will be angularly positioned as shown in FIG. 5. After this tooth passes the tool and the latter has been retracted as permitted by the cam, the drive is reversed through the gearing 67 for one revolution of the cutter blank during which the clutch 76 remains disengaged so that the position of the cam 70 remains fixed. Then, after manual advance of the tool by the screw 60, the operation is repeated to take the second cut around the successive teeth. This cycle is repeated to take the additional cuts shown in FIG. 18, the final pass 81 cutting into the blank to the depths shown in FIGS. 5, 6 and 7 to effect the final shaping of the first, fifth, and final teeth of the cutter and correspondingly shape the intervening teeth with all of the teeth tilted progressively in the manner above described. During such shaping of the teeth by the edges 46, 47 and 48 of the notch in the form tool 42, the end edges 49 of the latter turn down the adjacent portions of the cutter blank to form the peripheral surfaces 50. Owing to the swinging of the cutter, these flank surfaces associated with the different cutter teeth will be inclined at different angles relative to the cutter axis as illustrated in FIGS. 5 to 7.

When the cutter is made with inserted blades as shown in FIGS. 13, 14 and 15, the cutting edges of all of the teeth 31 to 39 are preferably fastened to the body 30 for tilting in angularly spaced longitudinal planes so as to achieve the desired progressive tilting above described and uniform loading of the cutting edges in spite of the rolling action between the cutter and work in the hobbing machine in which the cutter is to be used. Such adjustment may be achieved by forming each tooth on a bar 83 disposed in a slot 84 formed in the cutter body and extending generally parallel to the cuter axis. The bars are locked in the respective slots by wedges 85 drawn inwardly by screws 86.

In the exemplary cutter, the cutting edges of all of the teeth are of the same profile and formed on a block 87 of suitable cutting material such as tungsten carbide brazed or otherwise fixed to a backing 88 integral with and projecting from the bar 83. The latter is generally rectangular and substantially shorter than the spacing of flanges 89 secured to opposite ends of the body and defining the ends of the blade slots 84. Screws 90 threading through these flanges abut against opposite ends of the bar and enable the position thereof to be adjusted along the cutter axis. In this way and with the teeth of the same profile projecting from bars at the same point intermediate the bar ends, the teeth may, by proper adjustment of the screws 90, be located in a row extending around the body at the desired helix angle the same as in the integral tooth cutter first described.

Screws 91 threading inwardly through opposite end portions of each bar bear against the bottom of the body slots 84 and thus determine the angular position of the bar relative to the cutter axis. By adjusting these screws, the bars and their teeth may be tilted in radial planes thus enabling the cutting edges of the teeth to be tilted progressively and thus disposed in positions for effecting the uniform loading of the cutting edges as required in carrying out the present invention. After each bar has been adjusted to properly locate its tooth, the screw 86 is turned to tighten the wedge 85 and thus lock the bar and tooth rigidly in the body.

Setting of the inserted blades to dispose the teeth in a helical row having the desired lead, to step the teeth outwardly or inwardly as required for forming teeth of a particular contour on a particular workpiece, and to tilt the teeth successively in accordance with the present invention may be gauged in various ways. The projection equipment commonly used in checking the profiles of cutter teeth may be used to advantage. For example, the profiles of the individual teeth may be projected onto an enlarged layout such as that shown in FIG. 9 prepared as above described or by any other method showing the profiles of the different cutter teeth in proper relation to each other and the cutter axis. By adjusting the screws 90 and 91 for a given tooth projected onto the layout, the tooth profile may be matched with the corresponding enlarged outline on the layout, the wedge 85 then being tightened to retain the tooth setting. This procedure is repeated for all of the teeth thus forming the cutter as shown in FIG. 13 with the teeth properly positioned in accordance with the present invention.

Figure 12:
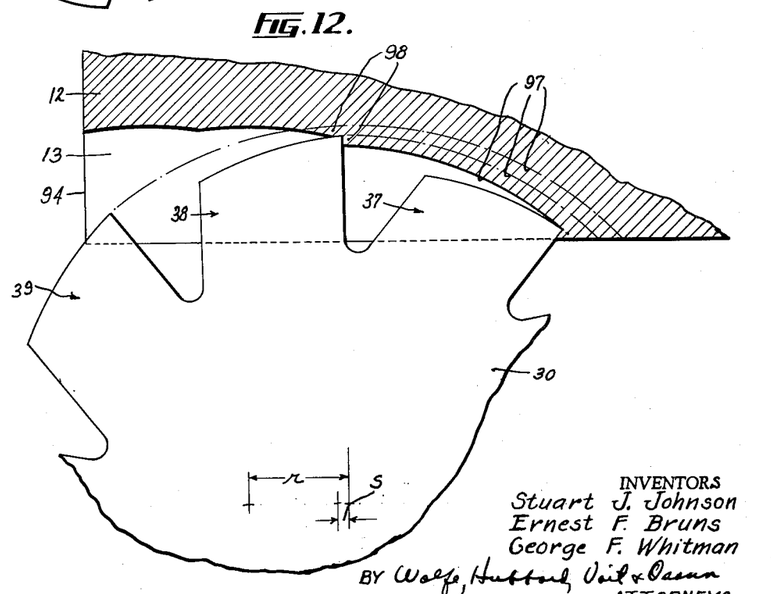
FIG. 12 is an enlarged fragmentary section illustrating the action of the cutter teeth on the work.

When the exemplary cutter having a single row of teeth is used in a hobbing machine as shown in FIG. 16, all of the cutter teeth in the row will pass through a tooth space of the workpiece in each revolution of the cutter and through the next adjacent space in the succeeding revolution so that metal will be removed from all of the tooth spaces in each revolution of the work and a plurality of revolutions of the cutter determined by the number of teeth to be formed on the work. With the cutter described above, all of the metal required to be removed from the work blank in a given plane to form a tooth space 13 will be cut out in a plurality of revolutions of the cutter, while the latter is being fed along the work axis at the preselected rate $r$ per revolution of the cutter or a distance $s$ per cutter tooth as illustrated on an enlarged scale in FIG. 12. As the teeth come into engagement with the work blank 12 at the end 94, the first teeth to act will cut through the end plane along lines 95 which, as shown in phantom, include only part of the profile of the cutting edges. The metal layers 96 thus removed are relatively shallow but increase progressively as the feed continues until the cutter has advanced far enough for the final tooth 39 to cut to its full depth. Then, as illustrated in FIGS. 11 and 12, the tooth space will be completed in a final revolution of the cutter during which the teeth 31 to 39 sweep through work along lines 97 and remove nine layers 98 to impart the desired final profile to the tooth space 13 as determined in the present instance by the profile of the cutting edge of the final tooth 39 in the row.

It will be apparent from the foregoing that the cutter above described is correlated in its construction with the hobbing machine in which it is to be used in service. That is to say, certain characteristics of the hobbing machine such as the available feed rate are built into the cutter and determine its design, for example, the radial stepping of the successive cutter teeth. Then, the profiles of the successive teeth are located in each tooth space of the work to be formed so that in cutting through the metal during the rolling action between the cutter and workpiece, each tooth cuts to the proper depth and is differently positioned angularly so that the entire profile of the cutting edge is effective and the thickness of the metal layer at all points around the edge is substantially uniform. As a result of such uniform loading of the different parts of each cutting edge and also of the different teeth, the thickness of all of the metal layers removed by the cutter teeth may approach the maximum which is permissible for the cutting and work materials involved in any given installation. Accordingly, the rate of metal removal in forming tooth parts has been increased substantially as compared with that obtainable in prior milling or hobbing operations with a corresponding reduction in the cost of manufacture.

For certain workpieces due usually to the particular required cross-section of the interdental spaces, it will not always be possible to achieve the desired uniform loading of the cutting edges by forming all of the edge profiles in a single turning operation of the form tool as above described. That is to say, some changes in the profiles may be required as by a second turning operation using a different form tool or a differently located swing center 44 while still retaining the progressive tilted relation of the center lines $y$ of the successive cutter teeth.

We claim as our invention:

1. A machine for milling interdental spaces of predetermined profile in a circular work disk having, in combination, a cutter and means supporting said cutter and work disk and rotating the same about crossed axes while relatively feeding the two along the work axis at a predetermined rate, said cutter comprising a generally cylindrical body, a row of teeth projecting from the periphery of the body and spaced along a generally helical line inclined relative to the cutter axis at an angle corresponding to and determined by the pitch of said spaces, cutting edges formed on the leading faces of each of said teeth, and having profiles determining the cross sectional profile of said interdental spaces, the edges of successive teeth beginning with the leading tooth of said row projecting outwardly from the cutter axis in progressively increasing steps correlated with said predetermined feed rate so as to take successively deeper cuts terminating with a final cut by the last tooth of the row to finish each space to said predetermined profile, the cutting edges of the successive teeth preceding said last tooth being tilted at progressively increasing angles about an axis extending transversely of the cutter axis and radially spaced outwardly beyond the teeth.

2. A machine for milling interdental spaces of predetermined profile in a circular work disk having, in combination, a cutter and means supporting said cutter and work disk and rotating the same about crossed axes while relatively feeding the two along the work axis at a predetermined rate, said cutter comprising a generally cylindrical body, a row of teeth projecting from the periphery of the body and spaced along a generally helical line inclined relative to the cutter axis at an angle corresponding to and determined by the pitch of said spaces, cutting edges formed on the leading faces of each of said teeth and each having a profile corresponding to that of said interdental spaces, the edges of successive teeth beginning with the leading tooth of said row and terminating with the final tooth of the row being tilted at progressively changing angles about an axis extending transversely of the cutter axis and radially spaced outwardly beyond the teeth.

3. A machine for milling interdental spaces of predetermined profile in a circular work disk having, in combination, a cutter and means supporting said cutter and work disk and rotating the same about crossed axes while relatively feeding the two along the work axis at a predetermined rate, said cutter comprising a generally cylindrical body, a row of teeth projecting from the periphery of the body and spaced along a generally helical line inclined relative to the cutter axis at an angle corresponding to and determined by the pitch of said spaces, cutting edges formed on the leading faces of each of said teeth and having profile corresponding to the cross sectional profile of said interdental spaces, the edges of successive teeth beginning with the leading tooth of said row and terminating with the last tooth of the row being tilted at progressively changing angles from the said last tooth, the amount of such tilting being such as to compensate for relative turning of the cutter and work disk and substantially equalize the thickness of the metal layer removed by each of said cutting edges across the full width thereof.

4. A milling machine as defined in claim 3 in which the layer of metal removed by the cutting edges of each of said teeth is of substantially uniform width across its entire cross section so as to load the cutting edges substantially uniformly.

5. A machine for milling interdental spaces of predetermined profile in a circular work disk having, in combination, a cutter and means supporting said cutter and work disk and rotating the same about crossed axes while relatively feeding the two along the work axis at a predetermined rate, said cutter comprising a generally cylindrical body, a row of teeth projecting from the periphery of the body and spaced along a generally helical line inclined relative to the cutter axis at an angle corresponding to and determined by the pitch of said spaces, cutting edges formed on the leading faces of each of said teeth and each having identical profiles determining the cross sectional profile of said interdental spaces, the profiles of the successive teeth preceding said last tooth being tilted at progressively changing angles about a fixed axis extending transversely of the cutter axis and radially spaced outwardly beyond the teeth.

6. A machine for milling interdental spaces of predetermined profile in a circular work disk having, in combination, a cutter and means supporting said cutter and work disk and rotating the same about crossed axes while relatively feeding the two along the work axis at a predetermined rate, said cutter comprising a generally cylindrical body, a row of teeth projecting from the periphery of the body and spaced along a generally helical line inclined relative to the cutter axis at an angle corresponding to and determined by the pitch of said spaces, cutting edges formed on the leading faces of each of said teeth and each having a profile approximating that of the interdental space to be formed and the last tooth determining such profile, the center lines of the successive teeth of the row being tilted at progressively changing angles relative to the cutter axis.

References Cited in the file of this patent

UNITED STATES PATENTS

| | | |
|---|---|---|
| 1,431,402 | Irwin | Oct. 10, 1922 |
| 1,883,636 | Edgar | Oct. 18, 1932 |
| 2,010,353 | Edgar | Aug. 6, 1935 |
| 2,414,790 | Barnard et al. | Jan. 28, 1947 |